Aug. 26, 1958    G. E. ATWOOD ET AL    2,849,287
PROCESSES FOR TREATING LANGBEINITE ORE TO OBTAIN
USEFUL PRODUCTS THEREFROM
Filed Feb. 18, 1955    6 Sheets-Sheet 5

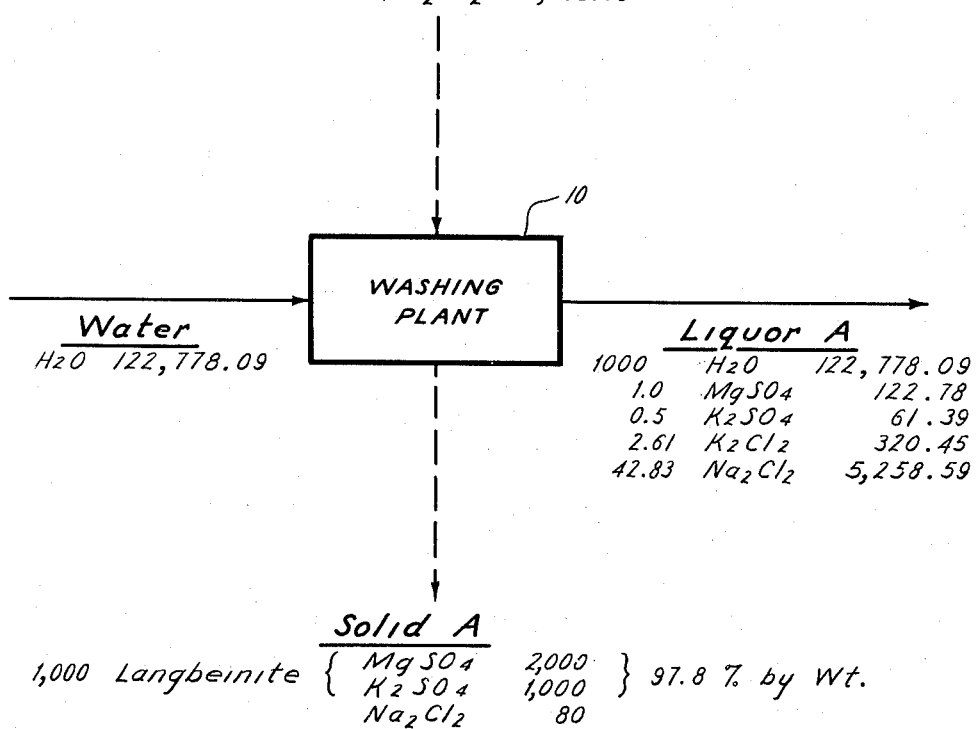

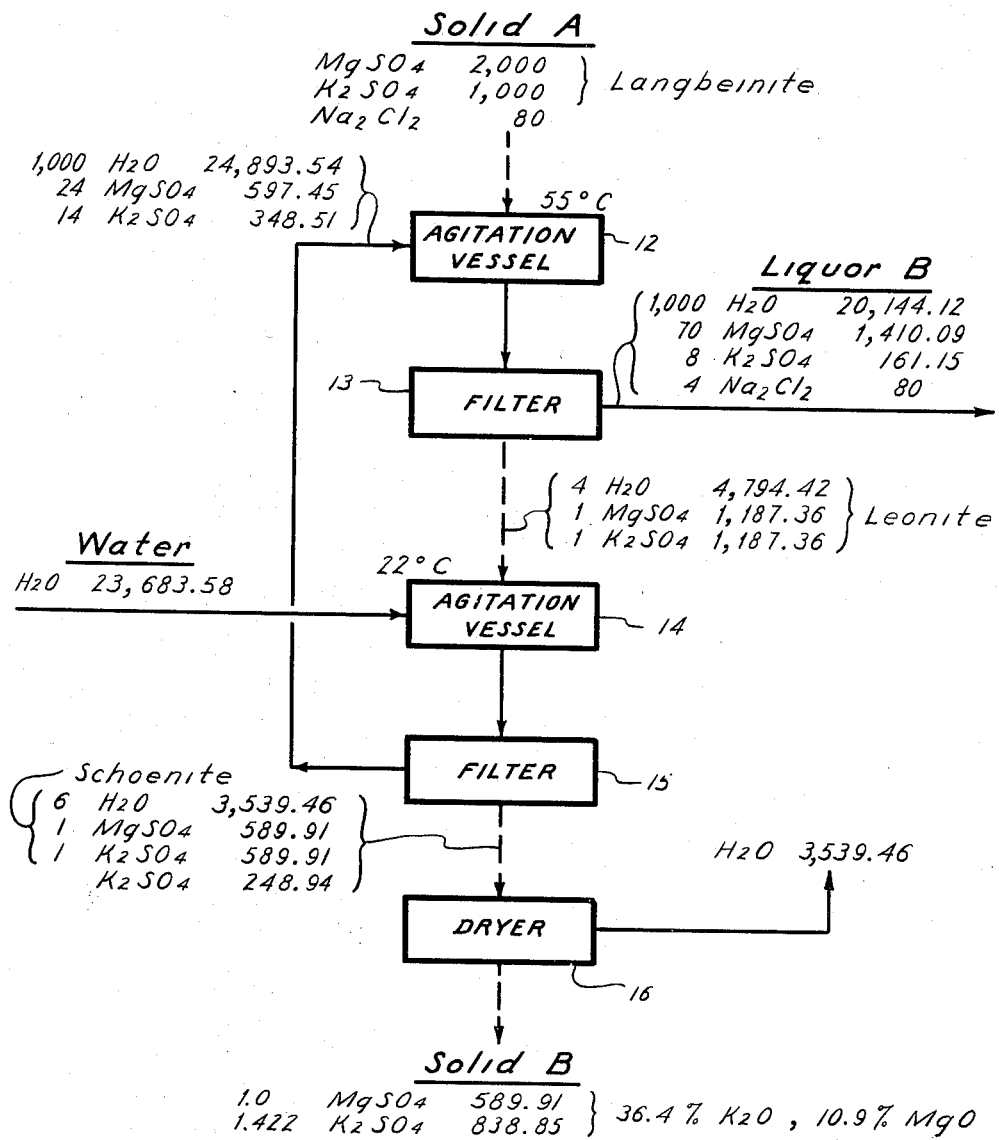

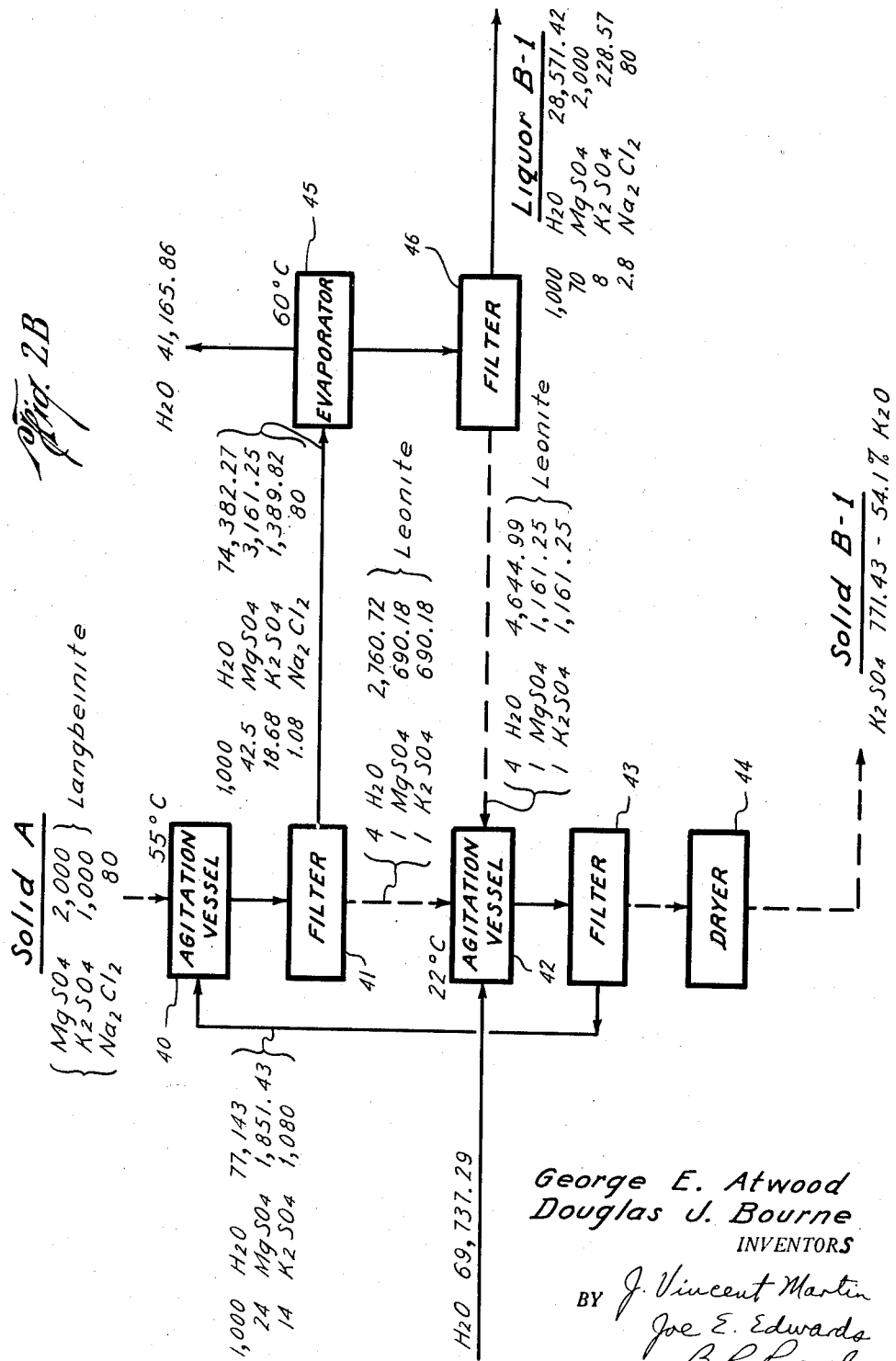

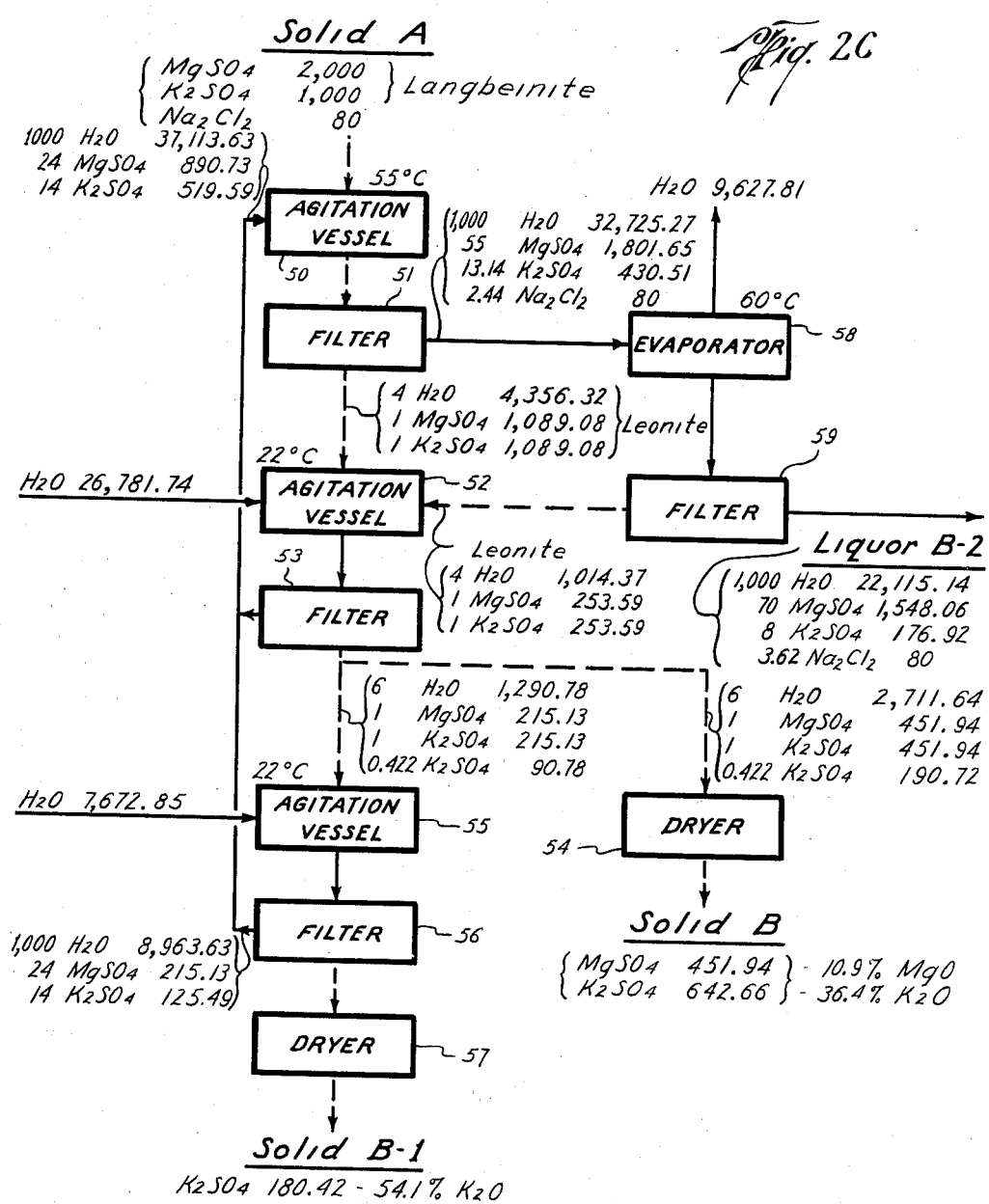

Fig. 3

Liquor B
| 1,000 | H₂O | 20,144.12 |
| 70 | MgSO₄ | 1,410.09 |
| 8 | K₂SO₄ | 161.15 |
| 4 | Na₂Cl₂ | 80 |

Liquor A
| 1,000 | H₂O | 45,895.87 |
| 1 | MgSO₄ | 45.90 |
| 0.5 | K₂SO₄ | 22.95 |
| 2.61 | K₂Cl₂ | 119.99 |
| 42.83 | Na₂Cl₂ | 1,965.87 |

H₂O 2,244.12

18 — COOLER  55°C

20 — REFRIGERATOR  20°C → −20°C

19 — AGITATION VESSEL  5°C

21 — THICKENER  −10 to −15°C

Liquor C
| 1,000 | H₂O | 50,345.29 |
| 23.06 | MgCl₂ | 1,160.96 |
| 5.86 | MgSO₄ | 295.02 |
| 6.04 | K₂Cl₂ | 304.09 |
| 13.92 | Na₂Cl₂ | 700.81 |

22 — FILTER

H₂O 13,450.58

Glauber salts
10 H₂O  13,450.58
1 Na₂SO₄  1,345.06

23 — EVAPORATOR  above 35°C
bleed from evaporator (optional)

24 — CENTRIFUGE

25 — DRYER → Solid C
Na₂SO₄  1,345.06

George E. Atwood
Douglas J. Bourne
INVENTORS

BY  J. Vincent Martin
     Joe E. Edwards
     B. R. Pravel
        ATTORNEYS

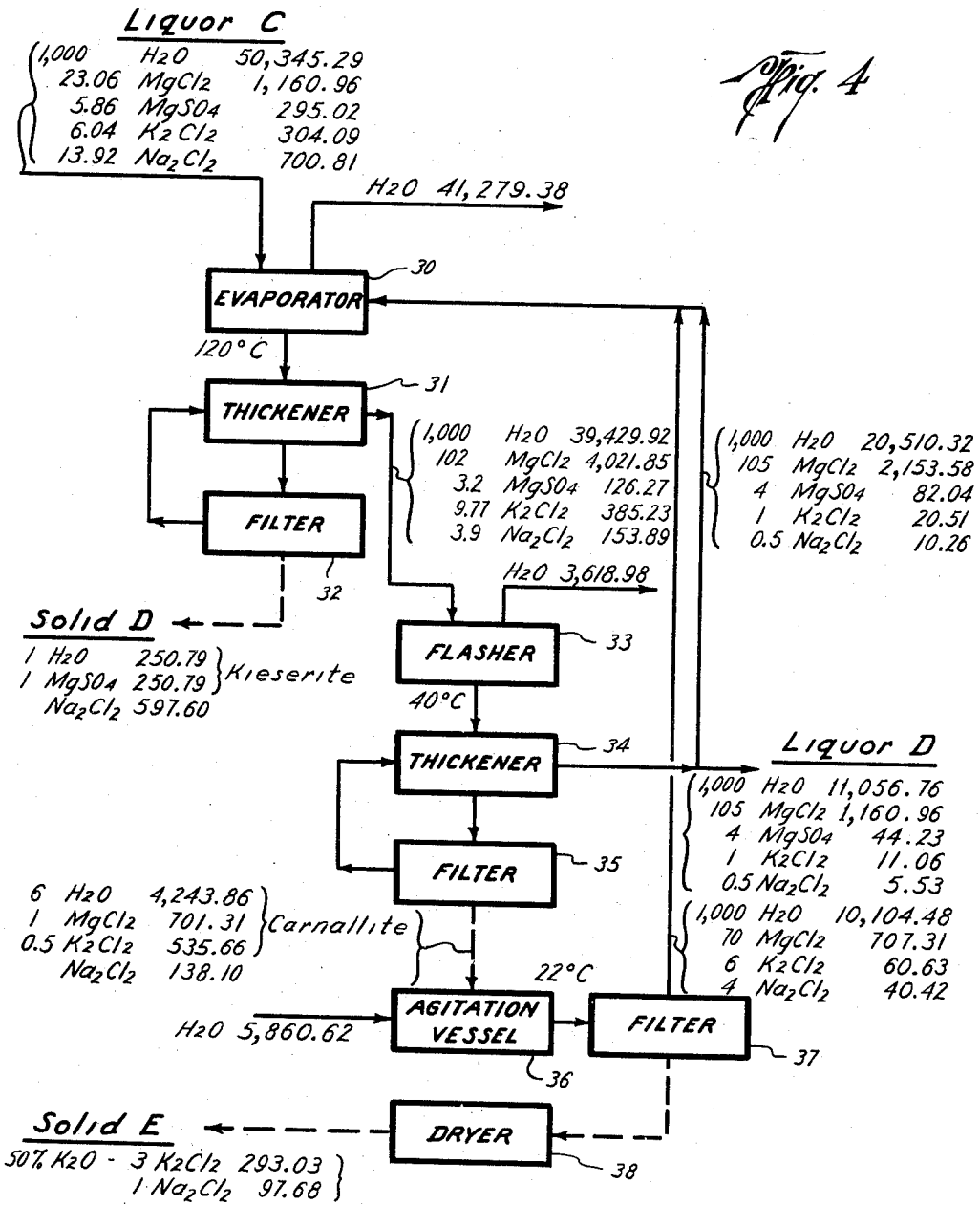

United States Patent Office 2,849,287
Patented Aug. 26, 1958

2,849,287

PROCESSES FOR TREATING LANGBEINITE ORE TO OBTAIN USEFUL PRODUCTS THEREFROM

George E. Atwood and Douglas J. Bourne, Carlsbad, N. Mex., assignors to Duval Sulphur & Potash Company, Houston, Tex., a corporation of Texas Application February 18, 1955, Serial No. 489,024

8 Claims. (Cl. 23—38)

This invention relates to new and useful improvements in processes for treating langbeinite ore to obtain useful products therefrom.

An object of this invention is to provide a new and improved process for treating langbeinite ore to obtain therefrom useful products such as sodium sulphate, potassium chloride, magnesium chloride, and potassium sulphate alone or in combination with magnesium sulphate.

An important object of this invention is to provide a new and improved process for treating langbeinite ore to produce a wide range of fertilizers therefrom wherein the ratio of potassium sulphate to magnesium sulphate is varied from that found in commercial langbeinite up to pure potassium sulphate.

Another object of this invention is to provide a new and improved process wherein essentially pure langbeinite is treated to produce a solid having a mol ratio of potassium sulphate to magnesium sulphate ranging from about 1:1 up to about 2:1, while also obtaining a liquor which without evaporation is of a sufficiently high concentration to be commercially useful in the production of sodium sulphate.

Another object of this invention is to provide a new and improved process wherein essentially pure langbeinite is treated to produce a liquor in which the amount of water is controlled so that such liquor can be reacted with a sodium chloride brine or with liquor from the leaching of langbeinite ore to produce sodium sulphate.

A further object of this invention is to provide a new and improved process for producing a solid product having an increased potassium content as compared to essentially pure langbeinite which includes the countercurrent hydration of said langbeinite in at least two stages.

Other objects of the invention will appear hereinafter and from the drawings which illustrate an example of this invention wherein:

Figure 1 is a flow diagram illustrating the first phase of the process of this invention.

Figure 2A is a flow diagram illustrating one form of the second phase of the process of this invention.

Figure 2B is a flow diagram illustrating a modified form of the second phase of the process of this invention.

Figure 2C is a flow diagram illustrating another modified form of the second phase of the process of this invention.

Figure 3 is a flow diagram illustrating the third phase of the process of this invention.

Figure 4 is a flow diagram illustrating the fourth phase of the process of this invention.

Considering the process of this invention briefly, the first phase of the process (Figure 1) involves the leaching of langbeinite ore to yield the solid A which is essentially pure langbeinite and a liquor A which is essentially saturated with sodium chloride, the principal contaminant in the ore. The second phase of the process (Figures 2A, 2B and 2C) is a countercurrent two stage hydration of the solid A to yield a solid B of a high potassium sulphate content as compared to magnesium sulphate (Figure 2A), or solid B-1 which is pure or essentially pure potassium sulphate (Figure 2B), or both solid B and solid B-1 (Figure 2C). The liquors B (Figure 2A), B-1 (Figure 2B) and B-2 (Figure 2C) are all controlled either by evaporation (Figures 2B and 2C) or by regulating the amount of water introduced (Figure 2A) so that the mol ratio of magnesium sulphate to potassium sulphate is high enough to render the production of sodium sulphate in the third phase of the process commercially practicable as will be explained.

In the third phase of the process, the liquor A from the first phase (Figure 1) is reacted with the liquor B, B-1 or B-2 from the second process phase (Figures 2A, 2B or 2C) to produce a solid C which is pure or essentially pure sodium sulphate and a liquor C which is either used in the fourth phase of this process or is discharged to waste. In the fourth phase, the liquor C is treated to obtain solid D, a mixture of kieserite and sodium chloride, which is returned to the third process phase or is discharged to waste. Solid E, which contains a high proportion of potassium chloride as compared to the sodium chloride is also produced for marketing or for use in the second phase of this process. The liquor D is high in magnesium chloride and therefore may be further processed to recover same, but if such recovery is impracticable, the liquor D is sent to waste.

Considering the process of this invention in detail, it should first be pointed out that in the drawings, the solid flow lines indicate liquids and the dotted flow lines indicate solids, and where the materials are in liquid form, the numbers to the left of the chemical components are in mols per one-thousand (1,000) mols of water, and where the materials are solid, the numbers on the left represent the mol ratio of the constituents. For both liquids and solids, the numbers on the right of the chemical components are total mols per one-thousand (1,000) mols of washed langbeinite (solid A in Figure 1). Thus, when the numbers on the right are all considered together, they show the material balance of the process as calculated on the basis of perfect liquid-solid separations. Also, the numbers in the drawings have been calculated by starting with a langbeinite ore from the Carlsbad, New Mexico, area, which has the following typical analysis:

| | Percent |
|---|---|
| Langbeinite ($K_2SO_4 \cdot 2MgSO_4$) | 40 |
| Halite ($Na_2Cl_2$) | 56 |
| Sylvite ($K_2Cl_2$) | 4 |
| Clay | Trace to 1 |
| Leonite ($K_2SO_4 \cdot MgSO_4 \cdot 4H_2O$) | Trace |
| Kieserite ($MgSO_4 \cdot H_2O$) | Trace |

However, it will be understood that other langbeinite ores may be used and the material balance would be changed in accordance with the quantities of the various compounds in the ore used. The components of the solids and liquors shown in the drawing are the ions which have been hypothetically grouped in pairs by the standard method in which it is assumed that all of the sulfate ion is first combined with magnesium, and the sulfate ion in excess of that amount is indicated as combined with potassium; if magnesium is in excess, that excess is indicated as magnesium chloride; the remaining cations are then balanced with the chloride ions.

In the first phase of the process of this invention (Figure 1), the langbeinte ore is leached in a washing plant 10 which is of well-known construction for providing flow of the fresh water countercurrent to the ore. The amount of water used in the leaching and the time of contact of the water with the ore are controlled in the well-known manner so that the solid A which is produced is essentially pure langbeinite and the liquor A contains only relatively small amounts of potassium sulphate or magnesium sulphate. With the quantities of water and ore indicated in Figure 1, the contact time would vary from about five minutes to ten minutes in order to get the solid A and liquid A indicated, but it will be appreciated that the time will vary with different quantities, analysis, and coarseness of ore and the quantities of water fed and with variations in the purity of the langbeinite desired in solid A, and in the concentration of the liquor A as is well known.

In the second phase of the process in the form illustrated in Figure 2A, the solid A of essentially pure langbeinite is hydrated in two stages, first in an agitation vessel 12 and then in a second agitation vessel 14, with fresh water being introduced into the second vessel 14. Between vessels 12 and 14, a filter 13 or other device for separating solids from liquids is disposed and following the second agitation vessel 14, a similar filter or separator 15 is positioned. The liquor from the filter 15 is fed to the first agitator vessel, such liquor having 24 mols $MgSO_4$ and 14 mols $K_2SO_4$ per 1,000 mols of water which allows complete and rapid reaction with the entering langbeinite, whereby the filtration or other separation at filter 13 yields leonite as solid and the liquor B which has a high magnesium sulphate content as compared to the potassium sulphate as indicated in the drawing (Figure 2A). Generally speaking, the liquor B is a sulphate liquor having at least about 65 mols of magnesium sulphate with not more than about 9 mols of potassium sulphate. The solid from the filter or other separator 15 is schoenite and additional potassium sulphate which are fed to a dryer 16 of conventional construction for removing the water to leave the solid B product which has a high potassium sulphate content as compared to the magnesium content and for that reason such product is especially useful as a fertilizer or a fertilizer component. Although the particular ratio of potassium sulphate to magnesium sulphate in the solid B is very desirable and ordinarily preferable, it will be recognized by those skilled in the art the particular ratio set forth in Figure 2A for solid B can be varied by changing the relative quantities of the water fed to agitation vessel 14 and of solid A fed to vessel 12. Thus, while still maintaining the mols of $MgSO_4$ and $K_2SO_4$ in the liquor B substantially the same as indicated in Figure 2A, the mol ratio of $MgSO_4$ and $K_2SO_4$ in the solid B can be varied from about 1:1 to about 2:1. The preferred temperature at which the reactions in vessels 12 and 14 take place are shown in Figure 2A, but it will be understood that the temperatures there shown can be varied within the limits of solubility chemistry. Thus, the temperature range in vessel 12 could be from about 40° C. to about 65° C. while still obtaining substantially the same magnesium sulphate to potassium sulphate mol ratio in the liquor B. Likewise, the reaction in vessel 14 can proceed with substantially the same yield if the temperature range is from about 0° C. to 60° C. It should be pointed out that the high mol ratio of magnesium sulphate to potassium sulphate in the liquor B is obtained without requiring evaporation which renders the process illustrated in Figure 2A highly desirable from a commercial standpoint since the relatively expensive evaporation step is unnecessary while still obtaining a solid B product which is enriched in potassium sulphate as compared to the langbeinite feed to vessel 12 and also a liquor B which can be commercially utilized as more fully set forth below in connection with the phase of the process shown in Figure 3.

Thus, in the third phase of the process as shown in Figure 3, the liquor B is simply cooled to about 5° C. in a cooler 18 which is preferably a vacuum cooler so as to eliminate the formation of salts on the cooling coils. Then, the cooled liquor B is fed into a vessel 19 for reaction with the liquor A which has been cooled in refrigeration unit 20 to about minus 20° C. and is also introduced into vessel 19. The product from the vessel 19 is fed through a thickener 21 and then a filter or separator 22 from which is produced Glauber's salts as the solid. The liquor from the filter 22 is returned to the thickener and liquor C is taken from the thickener for sending to the fourth phase of this process or otherwise utilized or discarded to waste. The thickener 21 is not essential and, if eliminated, the reaction product from vessel 19 would be fed directly to the filter or separator 22 from which the liquor C and Glauber's salts would be produced.

The Glauber's salts is evaporated at a temperature above 35° C. in an evaporator 23 so as to remove substantially all of the water therefrom; the remainder of the water is removed by the centrifuge or separator 24 and the dryer 25 so that the solid C is produced which is pure sodium sulphate ($Na_2SO_4$) product.

Although the temperatures in the third phase of the process are set forth in Figure 3, it will be understood that such temperatures can be varied, and equipment and procedures other than illustrated in Figure 3 can be used. For example, although the materials in the vessel 19 and in the thickener 21 are preferably cooled to between about minus 10° C. and minus 18° C., the reaction between the liquors A and B will proceed at a temperature as high as 15° C., so that the temperature would generally be below about 10° C.

In the event that it is impractical to use the liquor A in the third phase of the process, as for example when the third phase is carried out at a location distant from the place at which the first phase of the process is performed, then a sodium chloride brine would be used in place of the liquor A. Due to the high sulphate content of the liquor B obtained from the second phase of this process, the sodium chloride can be added as a brine rather than as solid salt which would otherwise be necessary to obtain the yield of pure Glauber's salts and ultimately the pure sodium sulphate ($Na_2SO_4$). When it is practical to use the liquor A rather than the salt brine, as when the first process phase is carried out at substantially the same location as the third phase, it is advantageous to do so because part of the sulphate, potassium and magnesium ions lost in the liquor A during leaching of the langbeinite ore are thus recovered and also, the liquor A is of such a concentration that it can be refrigerated or otherwise cooled to the temperatures indicated without deposition of solids so that heat exchange equipment often used in producing Glauber's salts is eliminated. Such heat exchange equipment is generally undesirable since the Glauber's salts are frequently deposited in such equipment.

From the foregoing description of the third phase of the process, it is believed evident that there are distinct advantages in using the liquor A from the first phase and the liquor B from the second phase. It should also be emphasized that the high mol ratio of magnesium sulphate to potassium sulphate in liquor B makes it possible to use the liquor A or a salt (NaCl) brine in producing the Glauber's salts and sodium sulphate. Otherwise, a solid salt (NaCl) would be required which is more costly than the liquor A or salt (NaCl) brine, and it would be difficult to obtain the pure $Na_2SO_4$ as product due to the insoluble matter such as clays and calcium sulphate ($CaSO_4$) commonly associated with rock salt. Also, it will be readily recognized that the liquor A and liquor B usually contain minor quantities of suspended water-insoluble matter which can be readily removed by any of the well-known clarification methods and equipment prior to their introduction into the third phase of the process shown in Figure 3. Thus, the production of high purity products in the third and fourth process phases is assured, whereas if solid sodium chloride were required, there would be no point at which the impurities can be inexpensively removed.

In the fourth phase of this process (Figure 4), the liquor C is evaporated to solid D which includes kieserite and sodium chloride by passing the liquor C through an evaporator 30, thickener 31 and filter 32. The temperature during such removal of the water is preferably maintained between 95° C. and 120° C. The solid D or a portion thereof is introduced into the cooler 18 or at some other convenient point in the third phase of the process to increase the sodium sulphate production from the third phase, or if such is impractical, then the solid D is discarded.

The thickener 31 may be eliminated, but in any event, the liquor coming from the thickener 31, or from the filter 32 if the thickener 31 is not used, is cooled in flasher 33, for example to a temperature of 40° C., by flashing off water. The liquor from the flasher 33 is then passed to a filter or separator 35, with a thickener 34 therebetween, if desired. The solid from the filter 35 is carnallite mixed with sodium chloride as indicated in Figure 4, which solid is reacted with fresh water in an agitation vessel 36. The liquor from the vessel 36 is separated into the liquid and solid phases by filter or separator 37, with the solid therefrom being sent to a dryer 38 from which the solid E is produced. The solid E is composed of potassium chloride and sodium chloride, the potassium analyzing about 50% $K_2O$ which is suitable for marketing as a fertilizer. In some cases, the solid E can be re-introduced into the system at the agitation vessel 12 (Figure 2A) in the second phase of the process to increase the potassium sulphate in solid B.

The liquor D which comes off the thickener 34 is high in magnesium chloride and, if economical, the liquor D can be further processed (not shown) to recover the magnesium chloride or otherwise utilized or discharged to waste. If the thickener 34 is not used, it will be understood that the liquor D comes from the filter 35. The return of the effluent liquor from filter 37 to evaporator 30 for recovery of dissolved salts will also be noted. It is particularly important to note that in the fourth process phase, a portion of the liquor from the thickener 34 is recycled to the evaporator 30 in sufficient quantity so that potassium salts are not stable as a solid phase in the discharge from the evaporator 30, thereby maintaining the solid D free of potassium.

The complete process of this invention is thus illustrated in the flow diagrams of Figures 1, 2A, 3 and 4. If it becomes desirable to produce pure potassium sulphate instead of the high potassium sulphate content solid B of Figure 2A, the second process phase of Figure 2A can be modified as illustrated in Figures 2B and 2C. The modified phases of Figures 2B and 2C differ from the phase shown in Figure 2A mainly in that more fresh water is introduced in the modified phases than in the Figure 2A phase in order to produce the pure potassium sulphate product; the volume of the liquor discharged from the modified phase of Figures 2B and 2C is reduced by evaporation so that the mol ratio of the magnesium sulphate to the potassium sulphate is substantially the same as the liquor B from the phase of Figure 2A.

Thus, in Figure 2B, the solid A from the first phase (Figure 1) is passed through the vessel 40, filter 41, vessel 42, filter 43 and dryer 44, which equipment corresponds with the vessel 12, filter 13, vessel 14, filter 15, and dryer 16 of Figure 2A. The solid B-1 from the dryer 44 is pure potassium sulphate which is produced by the increased quantity of fresh water introduced into the vessel 42 as compared to the fresh water introduced into vessel 12 so that all of the magnesium sulphate is removed with the liquor returning from the filter 43 to the vessel 40. Due to the increased amount of water injected, the liquor fed to vessel 40 has a large amount of water therewith which results in a large quantity of water in the liquor from the filter 41. Therefore, in order to produce an outgoing liquor corresponding to the liquor B, the liquor filter 41 is sent to an evaporator 45 and then is filtered by filter 46 to produce the liquor B-1 having substantially the same concentration of magnesium sulphate and potassium sulphate as liquor B. The solid from filter 46 is leonite which is returned to the agitation vessel 42 to increase the output of the solid B-1.

In Figure 2C, the solid A from the first phase (Figure 1) is passed through the agitation vessel 50, filter 51, agitation vessel 52, filter 53 and dryer 54 which apparatus corresponds with the vessel 12, filter 13, vessel 14, filter 15 and dryer 16 in Figure 2A. The amount of fresh water introduced into the vessel 52 is substantially the same as introduced to vessel 14 and the solid B from the dryer 54 has substantially the same mol ratio of magnesium sulphate and potassium sulphate as the solid B from the dryer 16.

Part of the solid from the filter 53, as desired, is fed to the agitation vessel 55, filter 56, and dryer 57, with the quantity of fresh water introduced into vessel 55 being sufficient to effect a yield of pure potassium sulphate from the dryer 57. Due to the large amount of water introduced in order to get the pure potassium sulphate, the liquor from the filter 51 is evaporated in evaporator 58 and filtered in filter 59 to obtain the liquor B-2 which has substantially the same mol ratio of magnesium sulphate to potassium sulphate as the liquor B in Figure 2A. The solid leonite from filter 59 is returned to the agitation vessel 52 to increase the yields of solid B and/or solid B-1.

Although the production of the potassium sulphate products in the second phase of the process is described above and illustrated in the drawings as embodying only two hydration or reaction steps, it is to be understood that additional steps can be employed in order to improve the reaction rate. Also, the two stages or reaction steps of the second process phase could be accomplished in a single countercurrent system wherein equivalent liquors and thus the same phase stabilities are obtained.

In the third phase of the process illustrated in Figure 3, potassium chloride could be produced with the Glauber's salts from filter 22 if the potassium content in the liquor A exceeds the amount which can be tolerated or dissolved in the liquor C. Such a condition would not normally occur because the liquor C is capable of dissolving or tolerating substantially more potassium than indicated in the drawings, but if a langbeinite ore of a considerably higher potassium content than that indicated in Figure 1 is used, then the potassium content of the liquor A would be accordingly increased so as to obtain some potassium chloride with the Glauber's salts. The potassium chloride can be readily separated from the Glauber's salts by any well-known mechanical methods such as classification by crystal size or specific gravity.

Also, an intermediate product of astrakanite

$$(Na_2SO_4 \cdot MgSO_4 \cdot 4H_2O)$$

can be formed prior to forming the Glauber's salts so as to increase the amount of the sodium sulphate, solid C, without additional evaporation of water. Such modification involves the reacting of liquors B and C in an additional reaction vessel or step (not shown) prior to the vessel 19 to obtain an intermediate solid upon filtration which is the astrakanite, with the liquor from such filtration being evaporated to produce solids ($MgSO_4 \cdot H_2O$ and NaCl) which are also introduced into the reaction between liquors B and C. The astrakanite then would be reacted in vessel 19 with a liquor A of a reduced sodium chloride content at a temperature below about 10° C. to thereby obtain an increased amount of the Glauber's salts from the filter 22 as compared to the amount shown in Figure 3. The Glauber's salts would then be evaporated and further treated in the same manner as above described in connection with Figure 3 to obtain an increased amount of sodium sulphate solids.

It will be appreciated by those skilled in the art that the process of this invention involves the variables of time, temperatures, quantities and concentrations, all of which are controlled within the known limits of solubility chemistry and may be varied within such limits to get the products indicated in the drawings without departing from the spirit of this invention. Thus, the numerical values given for quantities, concentrations, temperatures and time herein and in the drawings are subject to variation without involving invention. With the particular values specified in the drawings, the liquors B, B–1, B–2 and other liquors in the process are well within the limits of particular phase stability and in no place do they approach the critical boundaries which might cause difficult operation.

What is claimed is:

1. A process of treating langbeinite ore to obtain useful products therefrom, comprising the steps of, treating said ore to obtain a solid of essentially pure langbeinite, reacting said pure langbeinite with water in a system substantially free of potassium chloride to obtain a sulphate liquor and a solid having a greater potassium sulphate content than said pure langbeinite, reacting said sulphate liquor with a sodium chloride liquor at a temperature below about 10° C. to obtain Glauber's salts and a concentrated magnesium chloride liquor having a magnesium chloride content between about 15 mols and about 30 mols per 1,000 mols of water, controlling the sulphate concentration of said sulphate liquor so that it is sufficiently high to yield said concentrated magnesium chloride liquor and Glauber's salts, removing water from said concentrated magnesium chloride liquor to obtain sodium chloride and magnesium sulphate solids and a very concentrated magnesium chloride liquor having a magnesium chloride content between about 80 mols and about 100 mols per 1,000 mols of water, cooling said very concentrated magnesium chloride liquor to produce carnallite and sodium chloride solids and a very highly concentrated magnesium chloride liquor having a magnesium chloride content in excess of 100 mols per 1,000 mols of water, and reacting said carnallite and sodium chloride solids with water to obtain a solid which is predominantly potassium chloride.

2. A process of treating langbeinite ore to obtain useful products therefrom, comprising the steps of, treating said ore to obtain a solid of essentially pure langbeinite then hydrating said pure langbeinite by introducing fresh water in a system substantially free of potassium chloride in countercurrent flow relative to said pure langbeinite to form an intermediate sulphate liquor and an intermediate solid phase of leonite and a final solid which when dried has an increased potassium sulphate content as compared to said pure langbeinite, reacting said sulphate liquor with a sodium chloride liquor at a temperature below about 10° C. to obtain Glauber's salts and a concentrated magnesium chloride liquor having a magnesium chloride content between about 15 mols and about 30 mols per 1,000 mols of water, controlling the sulphate concentration of said sulphate liquor so that it is sufficiently high to yield said concentrated magnesium chloride liquor and Glauber's salts, removing water from said relatively concentrated magnesium chloride liquor to obtain sodium chloride and magnesium sulphate solids and a very concentrated magnesium chloride liquor having a magnesium content between 80 mols and about 100 mols per 1,000 mols of water, cooling said very concentrated magnesium chloride liquor to produce carnallite and sodium chloride solids and a very highly concentrated magnesium chloride liquor having a magnesium chloride content in excess of 100 mols per 1,000 mols of water, and reacting said carnallite and sodium chloride with water to obtain a solid which is predominantly potassium chloride.

3. The process set forth in claim 1, wherein the steps of controlling the sulphate concentration of the sulphate liquor is effected by controlling the amount of water reacted with said pure langbeinite.

4. The process set forth in claim 1, wherein the step of controlling the sulphate concentration of the sulphate liquor is effected by evaporating a predetermined amount of water from said sulphate liquor.

5. The process set forth in claim 1, including the step of, controlling the amount of water reacted with said essentially pure langbeinite so that said solid produced from reacting the langbeinite and water is pure potassium sulphate.

6. A process as set forth in claim 1 with the additional step of recycling a portion of said highly concentrated magnesium chloride liquor to the water removal step in a quantity sufficient so that potassium salts are unstable in a solid phase with the magnesium sulphate and sodium chloride.

7. A process as set forth in claim 2, wherein the steps of controlling the sulphate concentration of the sulphate liquor is effected by controlling the volume of water introduced in the hydrating of said pure langbeinite.

8. A process as set forth in claim 2, with the additional step of introducing a predetermined volume of water in the hydrating step of the pure langbeinite to produce a solid which is substantially pure potassium sulphate.

References Cited in the file of this patent

UNITED STATES PATENTS

| 1,305,566 | Reeve | June 3, 1919 |
| 1,863,751 | Kipper | June 21, 1932 |
| 2,125,624 | Davis et al. | Aug. 2, 1938 |
| 2,295,257 | Butt et al. | Sept. 8, 1942 |
| 2,479,001 | Burke et al. | Aug. 16, 1949 |
| 2,684,285 | Dancy | July 20, 1954 |
| 2,687,339 | Dancy et al. | Aug. 24, 1954 |
| 2,733,132 | Burke | Jan. 31, 1956 |

OTHER REFERENCES

Mellor: Comprehensive Treatise on Inorganic and Theoretical Chemistry, vol. 4, pages 339–340, Longmans, Green and Co., N. Y. 1923.